United States Patent
Li et al.

(10) Patent No.: US 9,300,335 B2
(45) Date of Patent: Mar. 29, 2016

(54) DEVICE AND METHOD FOR COMMUNICATION CORRECTION

(71) Applicant: HUAWEI TECHNOLOGIES CO., LTD., Shenzhen, Guangdong (CN)

(72) Inventors: Xingwen Li, Shanghai (CN); Li Xian, Chengdu (CN); Tingzhao Li, Shanghai (CN); Lihong Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/516,931

(22) Filed: Oct. 17, 2014

(65) Prior Publication Data

US 2015/0036771 A1 Feb. 5, 2015

Related U.S. Application Data

(63) Continuation of application No. PCT/CN2012/074458, filed on Apr. 20, 2012.

(51) Int. Cl.
| | |
|---|---|
| *H04W 4/10* | (2009.01) |
| *H04B 1/10* | (2006.01) |
| *H04L 1/22* | (2006.01) |
| *H04B 17/21* | (2015.01) |
| *H04B 1/12* | (2006.01) |

(52) U.S. Cl.
CPC ............... *H04B 1/10* (2013.01); *H04B 1/123* (2013.01); *H04B 17/21* (2015.01); *H04L 1/22* (2013.01)

(58) Field of Classification Search
USPC .................... 375/340; 348/725, 607
See application file for complete search history.

(56) References Cited

U.S. PATENT DOCUMENTS

| | | |
|---|---|---|
| 2008/0037684 A1 | 2/2008 | Lin |
| 2009/0075612 A1 | 3/2009 | Keehr et al. |
| 2009/0098848 A1 | 4/2009 | Ruijter |

(Continued)

FOREIGN PATENT DOCUMENTS

| | | |
|---|---|---|
| CN | 1571549 | 1/2005 |
| CN | 1747569 | 3/2006 |

(Continued)

OTHER PUBLICATIONS

Extended European Search Report dated Mar. 11, 2015 in corresponding European Patent Application No. 12741531.3.

(Continued)

*Primary Examiner* — Eva Puente
(74) *Attorney, Agent, or Firm* — Staas & Halsey LLP

(57) ABSTRACT

Embodiments of the present invention provide a device and method for communication correction. The device includes a receiving channel and a correction channel, where the receiving channel includes an analog radio-frequency front end, a demodulator, a first analog-to-digital converter, and a first channel correction module that are connected sequentially, and the correction channel includes a frequency converter, a second analog-to-digital converter, and a digital processor that are connected sequentially, where the analog radio-frequency front end is further connected to the frequency converter, and the digital processor is connected to the first channel correction module. With the technical solutions of the present invention, channel correction is performed on the receiving channel by the correction channel, so as to improve the precision of receiving a radio signal.

10 Claims, 6 Drawing Sheets

(56) References Cited

U.S. PATENT DOCUMENTS

| | | | |
|---|---|---|---|
| 2010/0225820 A1* | 9/2010 | Yun et al. | 348/607 |
| 2010/0233986 A1 | 9/2010 | Yamaji et al. | |
| 2010/0271558 A1* | 10/2010 | Seendripu et al. | 348/725 |
| 2010/0291891 A1* | 11/2010 | Ridgers et al. | 455/205 |
| 2012/0202442 A1 | 8/2012 | Li | |
| 2015/0092586 A1* | 4/2015 | de Ruijter et al. | 370/252 |

FOREIGN PATENT DOCUMENTS

| | | |
|---|---|---|
| CN | 101022434 | 8/2007 |
| CN | 101123460 | 2/2008 |
| CN | 102045754 | 5/2011 |
| CN | 102231636 | 11/2011 |
| JP | 2009-290276 | 12/2009 |
| JP | 2010-219697 | 9/2010 |
| WO | 03/065602 A2 | 8/2003 |
| WO | 2009/039289 A2 | 3/2009 |

OTHER PUBLICATIONS

Chinese Office Action dated Sep. 24, 2013 in corresponding Chinese Patent Application No. 201280000457.1.

PCT International Search Report dated Jan. 31, 2013 in corresponding International Patent Application No. PCT/CN2012/074458.

Notice of Reasons for Rejection, dated Sep. 11, 2015, in corresponding Japanese Application No. 2015-506065 (9 pp.).

* cited by examiner

DEVICE AND METHOD FOR COMMUNICATION CORRECTION

CROSS-REFERENCE TO RELATED APPLICATIONS

This application is a continuation of International Application No. PCT/CN2012/074458, filed on Apr. 20, 2012, which is hereby incorporated by reference in its entirety.

FIELD OF THE INVENTION

The present invention relates to radio communications technologies, and in particular, to a device and method for communication correction.

BACKGROUND OF THE INVENTION

FIG. 1 is a structural block diagram of a receiver in an existing radio communications system. As shown in FIG. 1, the receiver mainly includes an analogue radio-frequency front end 101, an analogue demodulator and intermediate-frequency channel 102, and an analogue-to-digital converter (Analogue to Digital Converter, ADC) 103. The analogue radio-frequency front end 101 generally includes a low noise amplifier (Low Noise Amplifier, LNA). Generally, various receivers in the radio communications system all have the non-ideal characteristics. For example, for an analogue IQ demodulation receiver, the non-ideal characteristics thereof are reflected in unbalanced amplitudes and phases of in-phase and quadrature (Inphase and Quadrature, IQ) signals, direct current (Direct Current, DC) interference, an in-band amplitude ripple and a group delay ripple in a radio-frequency filter of an analogue radio-frequency front end, non-linear distortion, and so on. For a digital intermediate-frequency receiver, the non-ideal characteristics thereof are reflected in an in-band amplitude ripple and a group delay ripple in a radio-frequency filter, an in-band amplitude ripple and a group delay ripple imported by an intermediate-frequency surface acoustic wave (SAW) filter, non-linear distortion, and so on.

In practical use, a correction channel is often used to correct the non-ideal characteristics of a receiver. Currently, a commonly used method for correcting a channel is that a test signal producing device is used to produce a radio-frequency test signal in a certain form, and at an input end of a receiver, the radio-frequency test signal and an input radio-frequency analogue signal are mixed by using a coupler or a resistor network and are sent to the input end of the receiver together. The test signal producing device further sends a signal of a digital form corresponding to the radio-frequency test signal to a channel correction module to be corrected by the channel correction module. After the correction performed by the channel correction module, cancellation processing is performed on the test signal, so as to attempt to eliminate the interference of the test signal to a service signal.

However, the cancellation processing performed on the test signal is not completely ideal, and a signal output after the cancellation processing still has certain residues of the test signal, which causes the interference to the service signal.

SUMMARY OF THE INVENTION

The present invention provides a device and method for communication correction, which are used to solve a problem of causing interference to a service signal when a test signal is used to correct a channel of a receiver in the prior art.

In one aspect, the present invention provides a device for communication correction, which includes a receiving channel and a correction channel, where the receiving channel includes an analogue radio-frequency front end, a demodulator, a first analogue-to-digital converter, and a first channel correction module; and the correction channel includes a frequency converter, a second analogue-to-digital converter, and a digital processor, where the analogue radio-frequency front end is connected to both the demodulator and the frequency converter, and is configured to amplify a received radio-frequency analogue signal, and output the amplified analogue signal to both the demodulator and the frequency converter;

the demodulator is connected to the first analogue-to-digital converter, and is configured to demodulate the amplified analogue signal, and output the demodulated analogue signal to the first analogue-to-digital converter;

the first analogue-to-digital converter is further connected to the first channel correction module, and is configured to perform analogue-to-digital conversion on the demodulated analogue signal to obtain a first digital signal, and output the first digital signal to the first channel correction module;

the frequency converter is connected to the second analogue-to-digital converter, and is configured to perform frequency conversion processing on the amplified analogue signal to obtain a first frequency conversion analogue signal, and output the first frequency conversion analogue signal to the second analogue-to-digital converter;

the second analogue-to-digital converter is connected to the digital processor, and is configured to perform analogue-to-digital conversion on the first frequency conversion analogue signal to obtain a digital signal after first analogue-to-digital conversion, and output the digital signal after first analogue-to-digital conversion to the digital processor;

the digital processor is further connected to the first channel correction module, and is configured to perform digital processing on the digital signal after first analogue-to-digital conversion to obtain a second digital signal, and output the second digital signal to the first channel correction module; and the first channel correction module is configured to correct the first digital signal according to the second digital signal, and output the corrected digital signal.

In another aspect, the present invention provides a method for communication correction, which includes:

amplifying, by an analogue radio-frequency front end of a receiving channel, a received radio-frequency analogue signal, and outputting the amplified analogue signal to both a demodulator of the receiving channel and a frequency converter of a correction channel;

demodulating, by the demodulator of the receiving channel, the amplified analogue signal, and outputting the demodulated analogue signal to a first analogue-to-digital converter of the receiving channel; and performing analogue-to-digital conversion, by the first analogue-to-digital converter of the receiving channel, on the demodulated analogue signal to obtain a first digital signal, and outputting the first digital signal to a first channel correction module of the receiving channel;

receiving, by the frequency converter of the correction channel, the amplified analogue signal output by the analogue radio-frequency front end of the receiving channel, and performing frequency conversion processing on the amplified analogue signal to obtain a first frequency conversion analogue signal, and outputting the first frequency conversion analogue signal to a second analogue-to-digital converter of the correction channel; performing analogue-to-digital conversion, by the second analogue-to-digital converter of the correction channel, on the first frequency conversion analogue signal to obtain a digital signal after first analogue-to-digital conversion, and outputting the digital signal after first analogue-to-digital conversion to a digital processor of the correction channel; and performing digital processing, by the digital processor of the correction channel, on the digital signal after first analogue-to-digital conversion to obtain a second digital signal, and outputting the second digital signal to the first channel correction module of the receiving channel; and correcting, by the first channel correction module of the receiving channel, the first signal according to the second digital signal, and outputting the corrected digital signal.

In the device and method for communication correction provided in embodiments of the present invention, a received service signal is divided, and the service signal itself is used to correct a channel of the receiver, so as to not only correct the non-ideal characteristics of the receiver through the correction channel, but also solve the problem of causing the interference to the service signal because of incomplete cancellation of the test signal when the test signal is used to correct the channel of the receiver in the prior art.

DETAILED DESCRIPTION OF THE EMBODIMENTS

Figure 1:
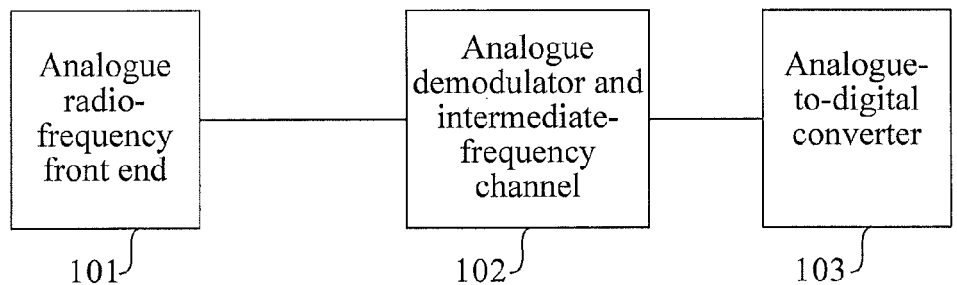
FIG. 1 is a structural block diagram of a receiver in an existing radio communications system.
Figure 2:
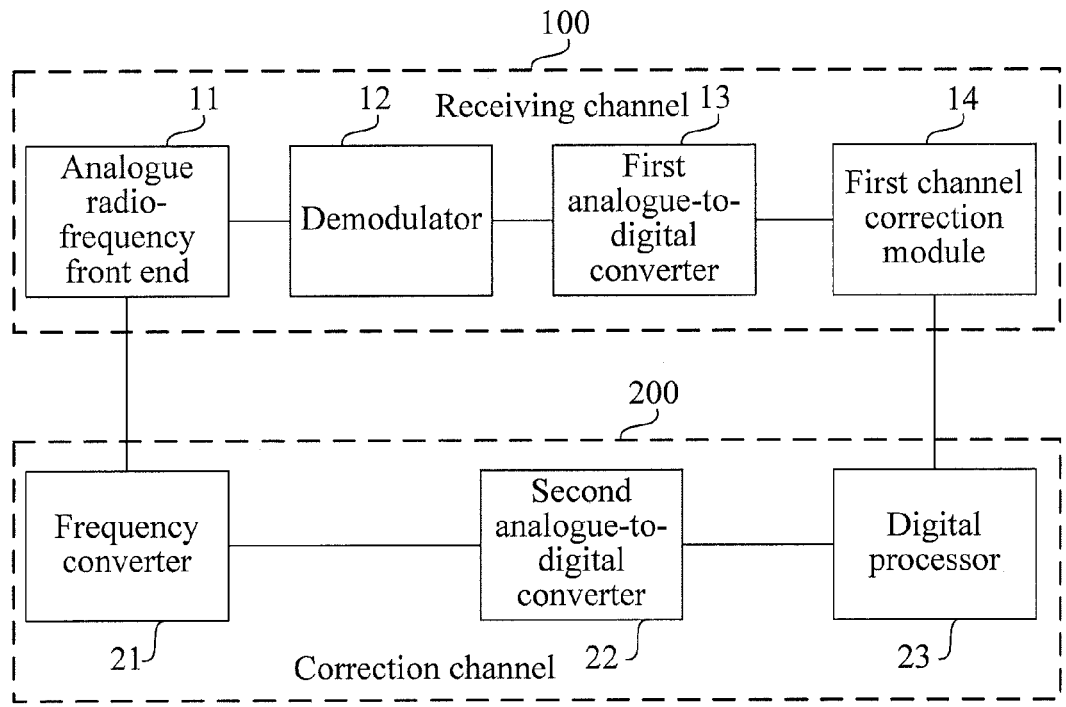
FIG. 2 is a schematic structural diagram of a device for communication correction according to an embodiment of the present invention.

FIG. 2 is a schematic structural diagram of a device for communication correction according to an embodiment of the present invention. As shown in FIG. 2, the device in this embodiment includes a receiving channel 100 and a correction channel 200.

The receiving channel 100 mainly includes an analogue radio-frequency front end 11, a demodulator 12, a first analogue-to-digital converter 13, and a first channel correction module 14. The analogue radio-frequency front end 11 is connected to the demodulator 12; the demodulator 12 is connected to the first analogue-to-digital converter 13; and the first analogue-to-digital converter 13 is connected to the first channel correction module 14.

The correction channel 200 mainly includes a frequency converter 21, a second analogue-to-digital converter 22, and a digital processor 23. The frequency converter 21 is connected to the second analogue-to-digital converter 22; and the second analogue-to-digital converter 22 is connected to the digital processor 23.

The analogue radio-frequency front end 11 is further connected to the frequency converter 21; and the digital processor 23 is further connected to the first channel correction module 14.

The structure of the receiving channel 100 in this embodiment is similar to a structure of a receiver in an existing communications system, and the difference lies in that functions of some components are not exactly the same. A function of each component in the receiving channel 100 is as follows:

The analogue radio-frequency front end 11 is mainly configured to receive a radio-frequency analogue signal, amplify the radio-frequency analogue signal, and then output the amplified analogue signal to both the demodulator 12 and the frequency converter 21. The amplifying mainly refers to low noise amplifying. That is to say, the analogue radio-frequency front end 11 in this embodiment outputs two paths of analogue signals after performing low noise amplifying on the received radio-frequency analogue signal. One of the two paths of analogue signals is input to the demodulator 12 that is connected to the analogue radio-frequency front end 11, and the other path is input to the frequency converter 21 that is connected to the analogue radio-frequency front end 11. The analogue radio-frequency front end 11 in this embodiment is mainly composed of some LNAs and a filter.

The demodulator 12 is configured to receive an analogue signal, demodulate the received analogue signal, and then output the demodulated analogue signal to the first analogue-to-digital converter 13 connected to the demodulator 12. In this embodiment, the analogue signal received by the demodulator 12 refers to one path of an analogue signal output by the analogue radio-frequency front end 11. The demodulator 12 in this embodiment may be composed of an analogue demodulator and an intermediate-frequency channel, which is not limited herein.

The first analogue-to-digital converter 13 is configured to perform analogue-to-digital conversion on the received demodulated analogue signal to obtain a first digital signal, and then output the first digital signal to the first channel correction module 14, so that the first channel correction module 14 corrects the first digital signal, thereby achieving the objective of overcoming the non-ideal characteristics of the receiver.

At this time, the first channel correction module 14 is configured to receive the first digital signal output by the first analogue-to-digital converter 13.

A function of each component in the correction channel 200 in this embodiment is as follows:

The frequency converter 21 is configured to receive an analogue signal, perform frequency conversion processing on the received analogue signal to obtain a first frequency conversion analogue signal, and then output the obtained first frequency conversion analogue signal to the second analogue-to-digital converter 22 connected to the frequency converter 21. The frequency converter 21 mainly converts a high-frequency signal (for example, 2100 MHz) into an intermediate-frequency signal (for example, 140 MHz). In this embodiment, the analogue signal received by the frequency converter 21 is one path of an analogue signal output by the analogue radio-frequency front end 11. The frequency converter 21 in this embodiment may be composed of an analogue frequency converter and an intermediate-frequency channel, which is not limited herein.

The second analogue-to-digital converter 22 is configured to receive the first frequency conversion analogue signal output by the frequency converter 21, perform analogue-to-digital conversion on the first frequency conversion analogue signal, convert the first frequency conversion analogue signal into a digital signal to obtain a digital signal after first analogue-to-digital conversion, and then output the digital signal after first analogue-to-digital conversion to the digital processor 23.

The digital processor 23 is configured to receive the digital signal after first analogue-to-digital conversion, which is output by the second analogue-to-digital converter 22, perform digital processing on the digital signal after first analogue-to-digital conversion to obtain a second digital signal, and then output the second digital signal. In this embodiment, the digital processor 23 outputs the second digital signal to the first channel correction module 14. The digital processor 23 may adopt a least square (Least Square, LS) algorithm and on the like to process the digital signal.

The digital signal processed by the correction channel 200 is a real signal. Because the digital signal does not pass through the demodulator, the non-ideal characteristics of the demodulator and the complex signal (including IQ non-ideal characteristics) of the demodulator do not exist. Therefore, the digital signal can be used to compensate the non-ideal characteristics of the demodulator.

It can be seen that, in this embodiment, the first channel correction module 14 not only receives the first digital signal output by the first analogue-to-digital converter 13, but also receives the second digital signal output by the digital processor 23, and corrects, according to the second digital signal output by the digital processor 23, the first digital signal output by the first analogue-to-digital converter 13, and outputs the corrected digital signal.

The first digital signal output by the first analogue-to-digital converter 13 includes a direct current offset (DC-OFFSET) signal and a mirror image signal of the demodulator 12. The correction channel 200 does not demodulate the analogue signal, but the frequency converter 21 performs frequency conversion processing on the analogue signal. Therefore, the second digital signal output by the digital processor 23 does not include the DC-OFFSET signal and the mirror image signal.

Based on the feature of slow change in the characteristics of a demodulator and a modulator, the first channel correction module 14 may adopt the LS algorithm and on the like to perform correlation comparison between one path of a digital signal from the first analogue-to-digital converter 13 and one path of a digital signal from the digital processor 23 to find the non-ideal characteristics, and then correct the found non-ideal characteristics.

In this embodiment, a channel of a receiver is corrected through the correction channel, so as to overcome various non-ideal characteristics of the receiver and improve the precision of the received digital signal. Meanwhile, in this embodiment, a service signal itself, which is received by the receiver, is used to correct the channel of the receiver, and an external test signal is no longer used, so as to avoid a cancellation operation performed on the external test signal and solve a problem of causing interference to the service signal because of incomplete cancellation of the external test signal.

Figure 3:
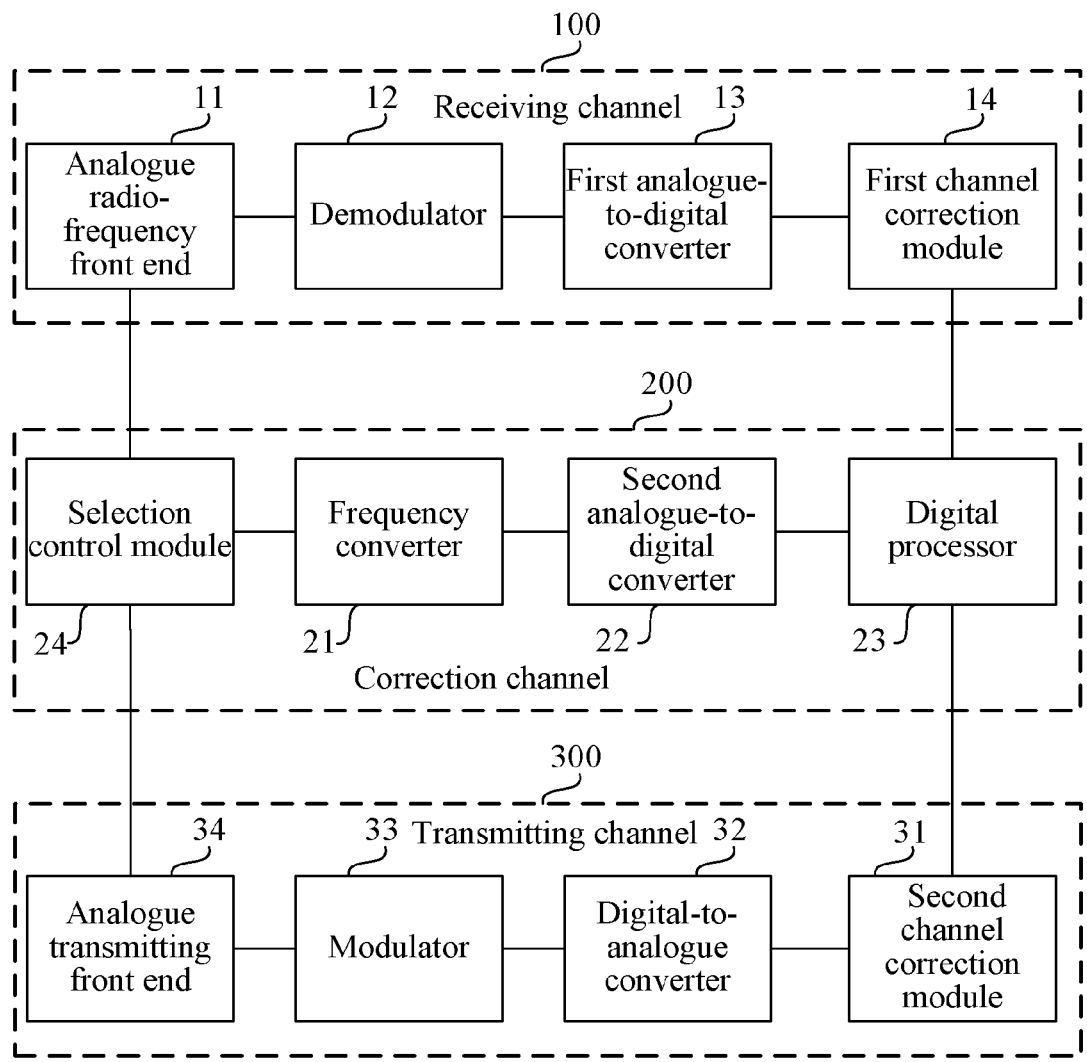
FIG. 3 is a schematic structural diagram of a device for communication correction according to another embodiment of the present invention.

FIG. 3 is a schematic structural diagram of a device for communication correction according to another embodiment of the present invention. This embodiment is implemented based on the embodiment shown in FIG. 2. As shown in FIG. 3, the device in this embodiment further includes a transmitting channel 300.

The transmitting channel 300 mainly includes a second channel correction module 31, a digital-to-analogue converter 32, a modulator 33, and an analogue transmitting front end 34. The second channel correction module 31 is connected to the digital-to-analogue converter 32; the digital-to-analogue converter 32 is connected to the modulator 33; and the modulator 33 is connected to the analogue transmitting front end 34.

Furthermore, the correction channel 200 in this embodiment further includes a selection control module 24. The selection control module 24 is connected to a frequency converter 21.

The analogue radio-frequency front end 11 is connected to the frequency converter 21 through the selection control module 24, that is to say, the selection control module 24 is connected between the analogue radio-frequency front end 11 and the frequency converter 21. The analogue transmitting front end 34 is connected to the frequency converter 21 through the selection control module 24, that is to say, the selection control module 24 is connected between the analogue transmitting front end 34 and the frequency converter 21. The digital processor 23 is further connected to the second channel correction module 31, and is further configured to provide a digital signal after digital processing to the second channel correction module 31.

The selection control module 24 is configured to control the communication between the frequency converter 21 and the analogue radio-frequency front end 11, or control the communication between the frequency converter 21 and the analogue transmitting front end 34. That is to say, the correction channel 200 in this embodiment is connected to the receiving channel 100 and the transmitting channel 300 at the same time, and at a certain time, the correction channel 200 is in communication with one of the receiving channel 100 and the transmitting channel 300 through the selection control module 24, so that the correction channel 200 performs channel correction on the channel that is in communication with the correction channel 200.

Based on the above description, the frequency converter 21 in this embodiment is further configured to receive an analogue signal after power amplification, which is output by the analogue transmitting front end 34, perform frequency conversion processing on the analogue signal after power amplification to obtain a second frequency conversion analogue signal, and output the second frequency conversion analogue signal to the second analogue-to-digital converter 22.

Correspondingly, the second analogue-to-digital converter 22 is further configured to receive the second frequency conversion analogue signal output by the frequency converter 21, perform analogue-to-digital conversion on the second frequency conversion analogue signal output by the frequency converter 21 to obtain a digital signal after second analogue-to-digital conversion, and output the digital signal after second analogue-to-digital conversion to the digital processor 23.

Correspondingly, the digital processor 23 is further configured to receive the digital signal after second analogue-to-digital conversion, which is output by the second analogue-to-digital converter 22, perform digital processing on the digital signal after second analogue-to-digital conversion to obtain a third digital signal, and output the third digital signal to the second channel correction module 31, so that by using the third digital signal provided by the digital processor 23, the second channel correction module 31 corrects a fourth digital signal to be corrected, and outputs the corrected digital signal to the digital-to-analogue converter 32.

The structure of the transmitting channel 300 in this embodiment is similar to a structure of a transmitter in an existing communications system, and the difference lies in that functions of some components are not exactly the same. A function of each component in the transmitting channel 300 is as follows:

The second channel correction module 31, located in a receiving front end of the transmitting channel 300, is configured to receive the fourth digital signal to be corrected, receive the third digital signal that is output by the digital processor 23 and is obtained after digital processing, correct the fourth digital signal, which is to be corrected, by using the third digital signal provided by the digital processor 23, and output the corrected digital signal to the digital-to-analogue converter 32. The fourth digital signal to be corrected refers to a digital signal that needs to be transmitted by the transmitting channel 300. The fourth digital signal to be corrected may be a digital signal input from the outside. Specifically, also based on the feature of slow change in the characteristics of a demodulator and a modulator, the second channel correction module 31 adopts an LS algorithm and on the like to perform correlation comparison between one path of a digital signal from the digital processor 23 and one path of an input digital signal to find non-ideal characteristics, and then correct the found non-ideal characteristics.

The digital-to-analogue converter 32 is configured to receive the corrected digital signal output by the second channel correction module 31, perform digital-to-analogue conversion on the corrected digital signal, convert the received corrected digital signal into an analogue signal, and then output the analogue signal obtained through the digital-to-analogue conversion to the modulator 33.

The modulator 33 is configured to receive the analogue signal output by the digital-to-analogue converter 32, modulate the received analogue signal, and output the modulated analogue signal to the analogue transmitting front end 34. The modulator 33 mainly modulates an intermediate-frequency signal onto a radio frequency, for example, adjusts a signal from 10 MHz to 2100 MHz, that is, shifts frequency spectrum.

The modulator 33 in this embodiment may be composed of an analogue modulator and an intermediate-frequency channel, which is not limited herein.

The analogue transmitting front end 34 is configured to receive the modulated analogue signal output by the modulator 33, perform power amplification processing on the received modulated analogue signal, transmit the analogue signal after power amplification, and output the analogue signal after power amplification to the frequency converter 21. The analogue transmitting front end 34 in this embodiment is generally composed of a power amplifier.

It can be known from the structure of the correction device in this embodiment that, the second channel correction module 31 specifically uses the characteristics of the transmitting channel 300, which are obtained by a previous digital signal, to correct a current digital signal, thereby overcoming various non-ideal characteristics of the transmitting channel 300, and improving the precision of transmitting the current digital signal. The foregoing previous digital signal is processed by the correction channel 200 to obtain the third digital signal, and the foregoing current digital signal is the fourth digital signal.

In practical use, not only a receiver has non-ideal characteristics, but also a transmitter has non-ideal characteristics. For example, the non-ideal characteristics of an analogue IQ modulation (also referred to as analogue quadrature modulation) transmitter are mainly reflected in a mirror image signal of an IQ signal and local oscillator feedthrough, which can seriously affect the precision of transmitting a signal. The device for communication correction in this embodiment is connected to the transmitting channel through the correction channel, and performs channel correction on the transmitting channel, thereby overcoming the non-ideal characteristics that exist in the transmitting channel, and improving the precision of transmitting a radio signal. In addition, in this embodiment, the transmitting channel and the receiving channel share one correction channel, so that the structure for implementation is simple and the cost for implementation is low.

Furthermore, the selection control module 24 in this embodiment may be a switch module or a radio-frequency combining module, which is not limited herein. Any component capable of implementing a selection control function is applicable to the technical solutions of the present invention.

In practical use, the characteristics of a channel are stable at a given period of time after the channel is corrected, that is to say, it is not necessary to correct the channel in real time. Based on the description, the selection control module 24 in this embodiment may adopt a time division multiplexing manner to control the communication between the frequency converter 21 and the analogue radio-frequency front end 11, or control the communication between the frequency converter 21 and the analogue transmitting front end 34. For example, the selection control module 24 controls the communication between the frequency converter 21 and the analogue radio-frequency front end 11 in a first sub-frame, so that the frequency converter 21 is disconnected from the analogue transmitting front end 34 in the first sub-frame, and the correction channel 200 performs channel correction on the receiving channel 100 in the first sub-frame. Then, the selection control module 24 controls the communication between the frequency converter 21 and the analogue transmitting front end 34 in a second sub-frame, so that the frequency converter 21 is disconnected from the analogue radio-frequency front end 11 in the second sub-frame, and the correction channel 200 performs channel correction on the transmitting channel 300 in the second sub-frame.

In each of the foregoing embodiments, the transmitting channel may be used for an analogue IQ modulation transmitter, for example, a zero intermediate-frequency transmitter, which is not limited herein. The receiving channel may be used for an analogue IQ demodulation receiver, for example, a zero intermediate-frequency receiver.

The following describes the working principle of the device for communication correction provided by the embodiment of the present invention in detail with reference to specific embodiments.

Figure 4:
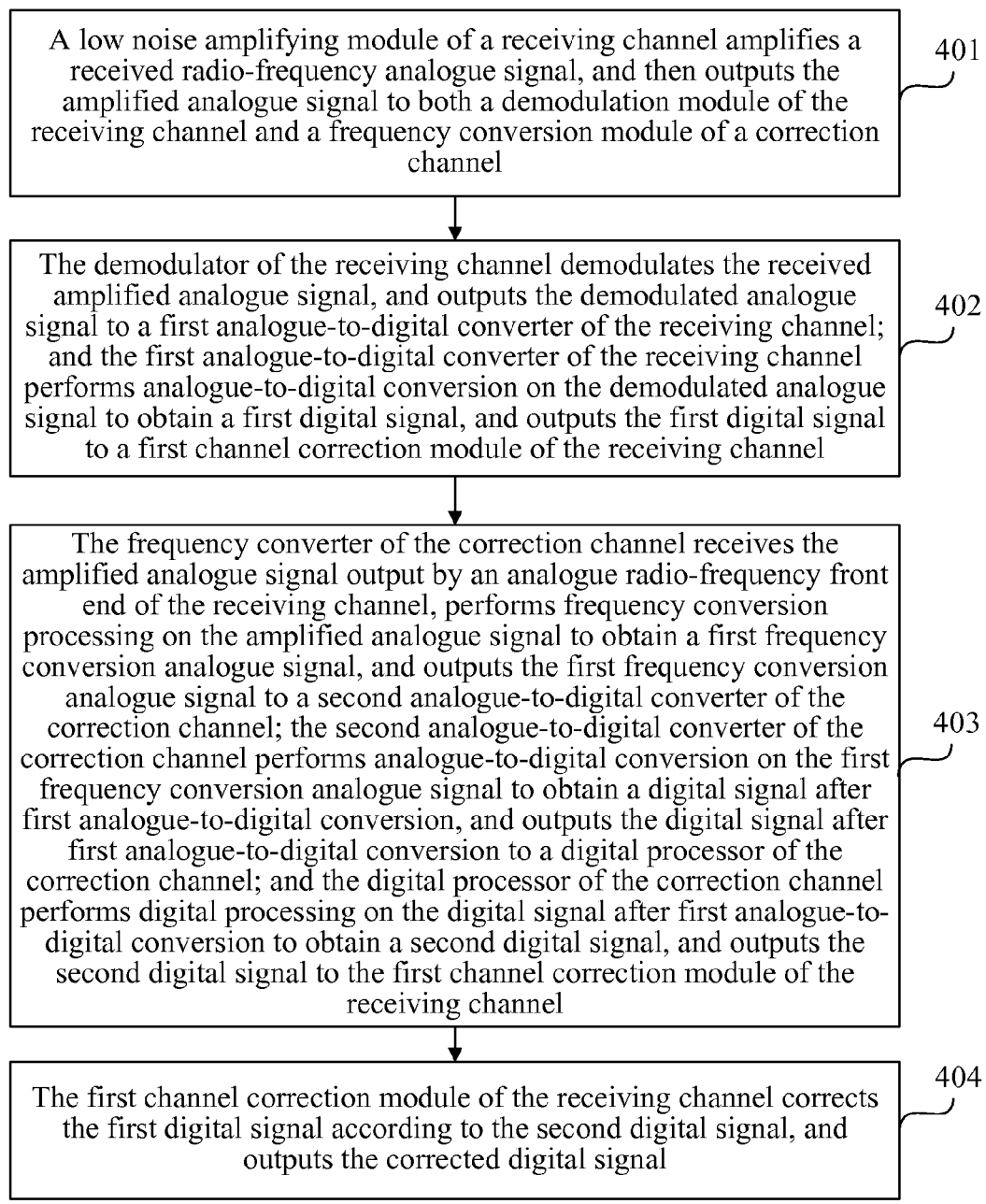
FIG. 4 is a flowchart of a method for communication correction according to an embodiment of the present invention.

FIG. 4 is a flowchart of a method for communication correction according to an embodiment of the present invention. As shown in FIG. 4, the method in this embodiment includes:

Step 401: An analogue radio-frequency front end of a receiving channel amplifies a received radio-frequency analogue signal, and outputs the amplified analogue signal to both a demodulator of the receiving channel and a frequency converter of a correction channel.

Step 402: The demodulator of the receiving channel demodulates the received amplified analogue signal, and outputs the demodulated analogue signal to a first analogue-to-digital converter of the receiving channel; and the first analogue-to-digital converter of the receiving channel performs analogue-to-digital conversion on the demodulated analogue signal to obtain a first digital signal, and outputs the first digital signal to a first channel correction module of the receiving channel.

Step 403: The frequency converter of the correction channel receives the amplified analogue signal output by the analogue radio-frequency front end of the receiving channel, and performs frequency conversion processing on the amplified analogue signal to obtain a first frequency conversion analogue signal, and outputs the first frequency conversion analogue signal to a second analogue-to-digital converter of the correction channel; the second analogue-to-digital converter of the correction channel performs analogue-to-digital conversion on the first frequency conversion analogue signal to obtain a digital signal after first analogue-to-digital conversion, and outputs the digital signal after first analogue-to-digital conversion to a digital processor of the correction channel; and the digital processor of the correction channel performs digital processing on the digital signal after first analogue-to-digital conversion to obtain a second digital signal, and outputs the second digital signal to the first channel correction module of the receiving channel.

Step 404: The first channel correction module of the receiving channel corrects the first digital signal according to the second digital signal, and outputs the corrected digital signal.

The method for communication correction in this embodiment is implemented by the device for communication correction provided by the embodiment of the present invention. The process about how the device for communication correction corrects the receiving channel is described in detail, and by correcting the receiving channel, the non-ideal characteristics of the receiving channel are overcome and the precision of receiving a radio signal is improved.

Figure 5:
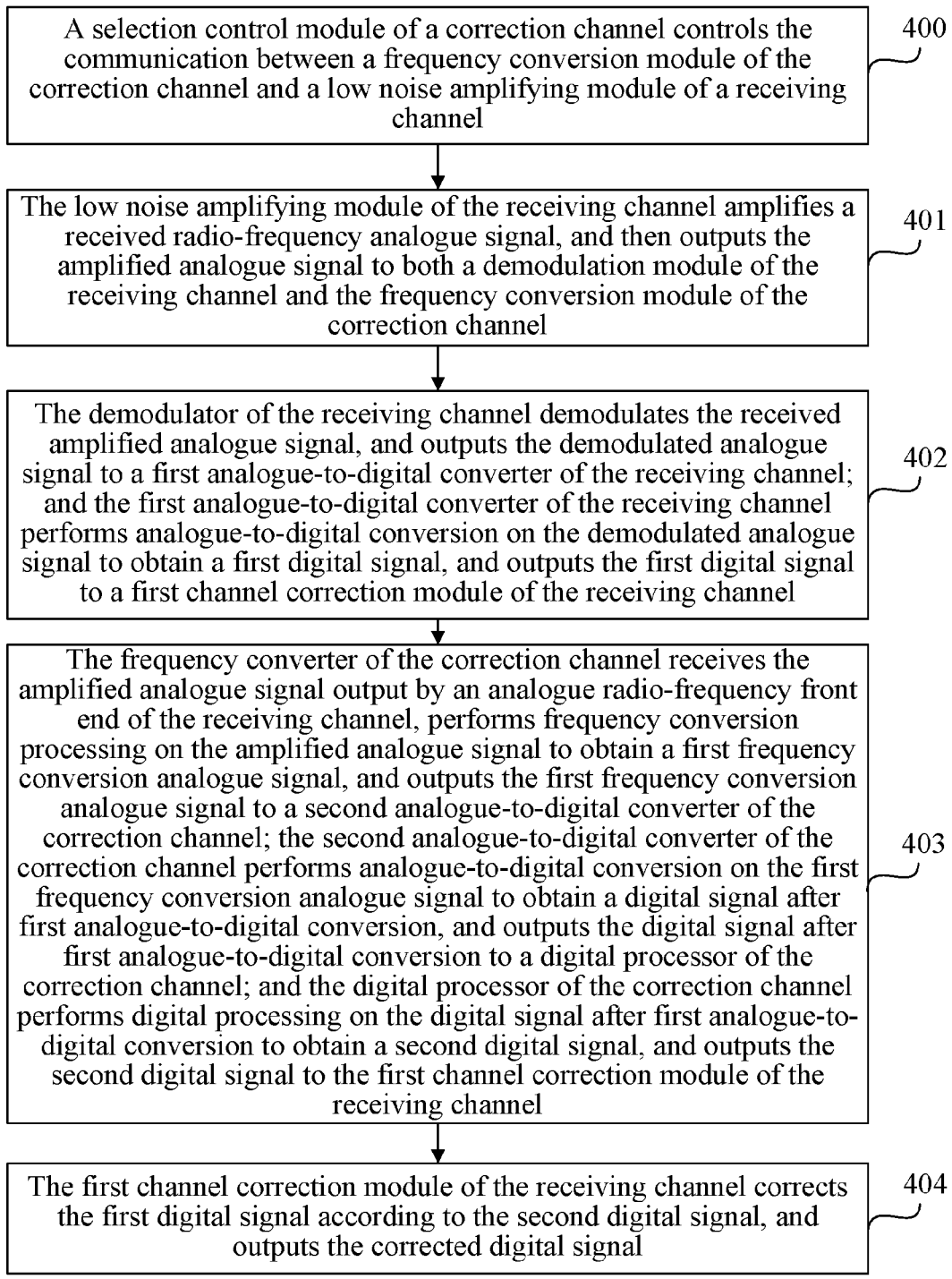
FIG. 5 is a flowchart of a method for communication correction according to another embodiment of the present invention.

FIG. 5 is a flowchart of a method for communication correction according to another embodiment of the present invention. This embodiment is implemented based on the embodiment shown in FIG. 4. As shown in FIG. 5, before step 401, the method in this embodiment includes:

Step 400: A selection control module of the correction channel controls the communication between the frequency converter of the correction channel and the analogue radio-frequency front end of the receiving channel.

Specifically, the selection control module may control the communication between the frequency converter and the analogue radio-frequency front end or an analogue transmitting front end in a time division multiplexing manner. In this embodiment, the selection control module controls the communication between the frequency converter and the analogue radio-frequency front end, to provide a condition for correcting the receiving channel by the correction channel.

The method for channel correction in this embodiment is applicable to a situation in which a receiving channel and a transmitting channel both exist. The selection control module first controls the communication between the frequency converter and the analogue radio-frequency front end, to provide a condition for correcting the receiving channel by the correction channel.

Figure 6:
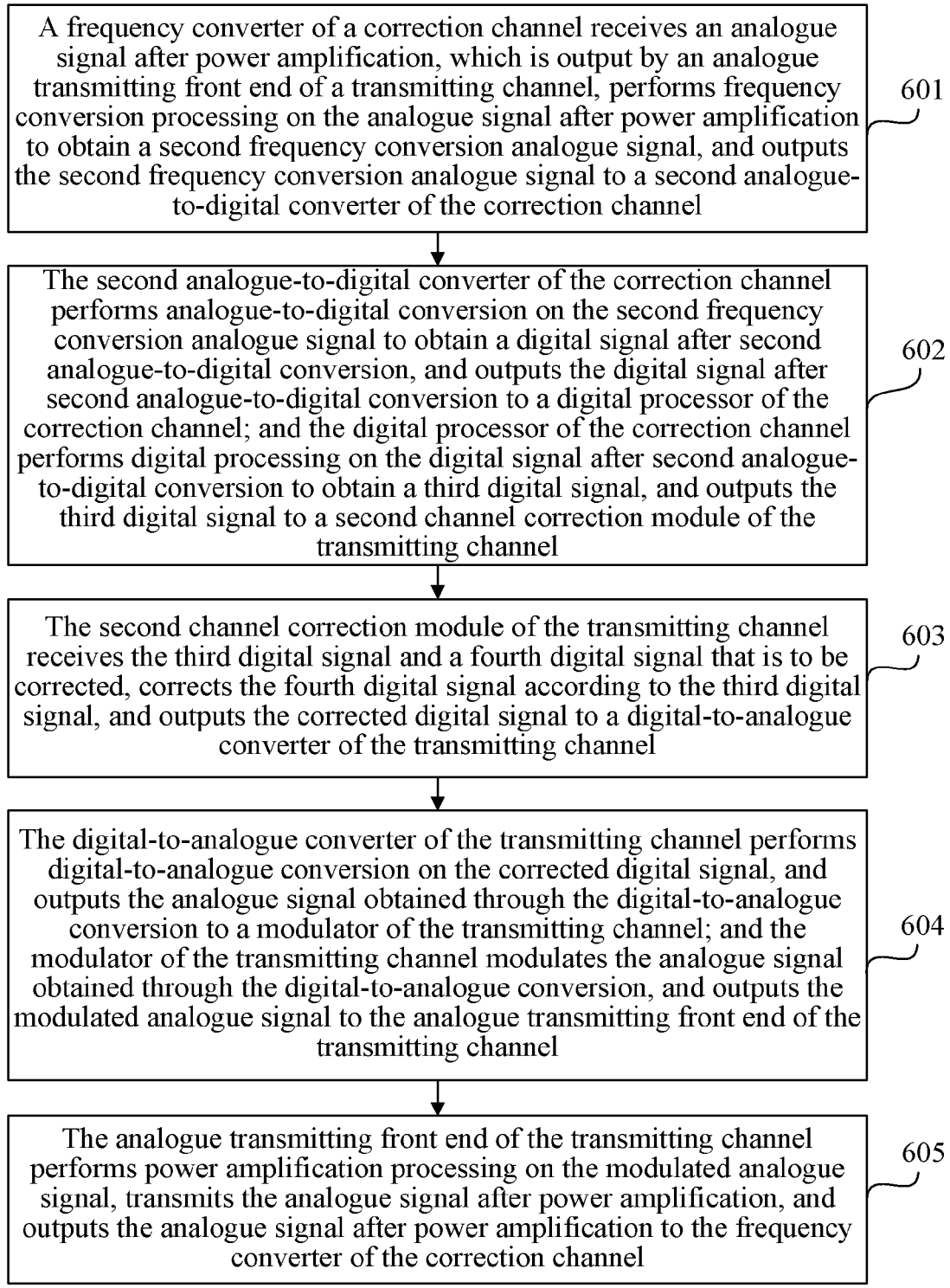
FIG. 6 is a flowchart of a method for communication correction according to still another embodiment of the present invention.

FIG. 6 is a flowchart of a method for communication correction according to still another embodiment of the present invention. As shown in FIG. 6, the method in this embodiment includes:

Step 601: A frequency converter of a correction channel receives an analogue signal after power amplification, which is output by an analogue transmitting front end of a transmitting channel, performs frequency conversion processing on the analogue signal after power amplification to obtain a second frequency conversion analogue signal, and outputs the second frequency conversion analogue signal to a second analogue-to-digital converter of the correction channel.

Step 602: The second analogue-to-digital converter of the correction channel performs analogue-to-digital conversion on the second frequency conversion analogue signal to obtain a digital signal after second analogue-to-digital conversion, and outputs the digital signal after second analogue-to-digital conversion to a digital processor of the correction channel; and the digital processor of the correction channel performs digital processing on the digital signal after second analogue-to-digital conversion to obtain a third digital signal, and outputs the third digital signal to a second channel correction module of a transmitting channel.

Step 603: The second channel correction module of the transmitting channel receives the third digital signal and a fourth digital signal that is to be corrected, corrects the fourth digital signal according to the third digital signal, and outputs the corrected digital signal to a digital-to-analogue converter of the transmitting channel.

Step 604: The digital-to-analogue converter of the transmitting channel performs digital-to-analogue conversion on the corrected digital signal, and outputs the analogue signal obtained through the digital-to-analogue conversion to a modulator of the transmitting channel; and the modulator of the transmitting channel modulates the analogue signal obtained through the digital-to-analogue conversion and outputs the modulated analogue signal to the analogue transmitting front end of the transmitting channel.

Step 605: The analogue transmitting front end of the transmitting channel performs power amplification processing on the modulated analogue signal, transmits the analogue signal after power amplification, and outputs the analogue signal after power amplification to the frequency converter of the correction channel.

The method for communication correction in this embodiment is implemented by the device for communication correction provided by the embodiment of the present invention. The process about how the device for communication correction corrects the transmitting channel is described in detail, and by correcting the transmitting channel, the non-ideal characteristics of the transmitting channel are overcome and the precision of transmitting a radio signal is improved.

Figure 7:
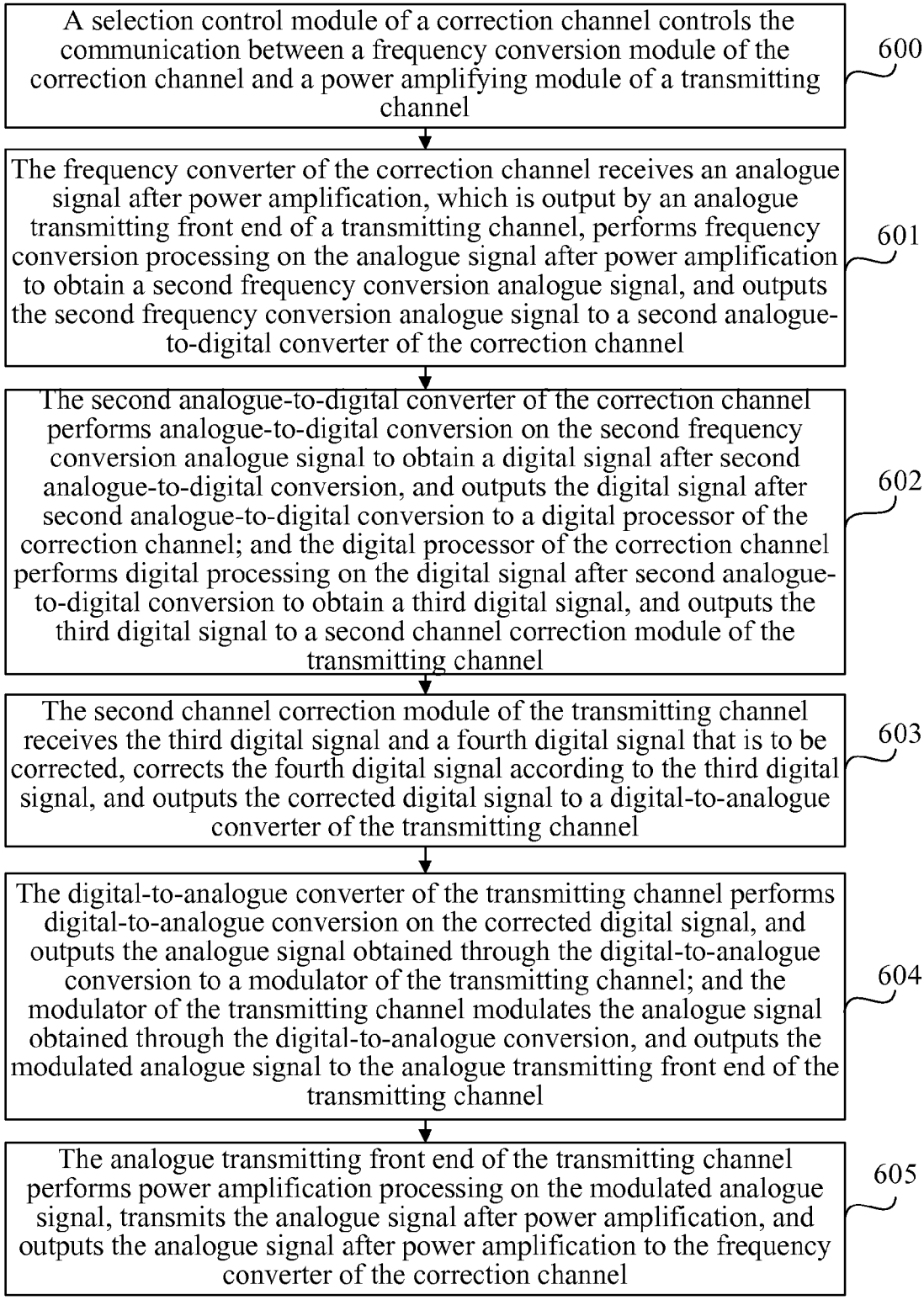
FIG. 7 is a flowchart of a method for communication correction according to still another embodiment of the present invention.

FIG. 7 is a flowchart of a method for communication correction according to still another embodiment of the present invention. This embodiment is implemented based on the embodiment shown in FIG. 6. As shown in FIG. 7, before step 601, the method in this embodiment includes:

Step 600: A selection control module of the correction channel controls the communication between the frequency converter of the correction channel and the analogue transmitting front end of the transmitting channel.

Specifically, the selection control module may control the communication between the frequency converter and the analogue radio-frequency front end or an analogue transmitting front end in a time division multiplexing manner. In this embodiment, the selection control module controls the communication between the frequency converter and the analogue transmitting front end, to provide a condition for correcting the transmitting channel by the correction channel.

The method for channel correction in this embodiment is applicable to a situation in which a receiving channel and a transmitting channel both exist. The selection control module controls the communication between the frequency converter and the analogue transmitting front end, to provide a condition for correcting the transmitting channel by the correction channel.

Persons of ordinary skill in the art should understand that all or part of the steps of the methods in each of the forgoing embodiments may be implemented by a program instructing relevant hardware. The program may be stored in a computer readable storage medium. When the program runs, the above steps of the method in each of the forgoing embodiments are performed. The storage medium may be any medium capable of storing program codes, such as ROM, RAM, magnetic disk, or optical disk.

Finally, it should be noted that the above embodiments are merely intended for describing the technical solutions of the present invention, other than limiting the present invention. Although the present invention is described in detail with reference to the foregoing embodiments, persons of ordinary skill in the art should understand that they can still make modifications to the technical solutions described in the foregoing embodiments, or make equivalent substitutions to some or all the technical features thereof, and such modifications or substitutions cannot make the essence of the corresponding technical solutions depart from the scope of the technical solutions of the embodiments of the present invention.

What is claimed is:

1. A device for communication correction, comprising a receiving channel and a correction channel, wherein
    the receiving channel comprises an analogue radio-frequency front end, a demodulator, a first analogue-to-digital converter, and a first channel correction module; and the correction channel comprises a frequency converter, a second analogue-to-digital converter, and a digital processor, wherein
    the analogue radio-frequency front end is connected to both the demodulator and the frequency converter, and is configured to amplify a received radio-frequency analogue signal, and output the amplified analogue signal to both the demodulator and the frequency converter;
    the demodulator is connected to the first analogue-to-digital converter, and is configured to demodulate the amplified analogue signal, and output the demodulated analogue signal to the first analogue-to-digital converter;
    the first analogue-to-digital converter is further connected to the first channel correction module, and is configured to perform analogue-to-digital conversion on the demodulated analogue signal to obtain a first digital signal, and output the first digital signal to the first channel correction module;
    the frequency converter is connected to the second analogue-to-digital converter, and is configured to perform frequency conversion processing on the amplified analogue signal to obtain a first frequency conversion analogue signal, and output the first frequency conversion analogue signal to the second analogue-to-digital converter;
    the second analogue-to-digital converter is connected to the digital processor, and is configured to perform analogue-to-digital conversion on the first frequency conversion analogue signal to obtain a digital signal, and output the digital signal to the digital processor;
    the digital processor is further connected to the first channel correction module, and is configured to perform digital processing on the digital signal to obtain a second digital signal, and output the second digital signal to the first channel correction module; and
    the first channel correction module is configured to correct the first digital signal according to the second digital signal, and output the corrected digital signal.

2. The device for communication correction according to claim 1, further comprising a transmitting channel, wherein the transmitting channel comprises a second channel correction module, a digital-to-analogue converter, a modulator, and an analogue transmitting front end; and the correction channel further comprises a selection control module connected to the frequency converter, wherein
    the analogue radio-frequency front end is connected to the frequency converter through the selection control module; the analogue transmitting front end is connected to the frequency converter through the selection control module; and the selection control module is configured to control communication between the frequency converter and the analogue radio-frequency front end, or control communication between the frequency converter and the analogue transmitting front end;
    the frequency converter is further configured to perform frequency conversion processing on an analogue signal after power amplification, which is output by the analogue transmitting front end, to obtain a second frequency conversion analogue signal, and output the second frequency conversion analogue signal to the second analogue-to-digital converter;
    the second analogue-to-digital converter is further configured to perform analogue-to-digital conversion on the second frequency conversion analogue signal to obtain a digital signal after second analogue-to-digital conversion, and output the digital signal after second analogue-to-digital conversion to the digital processor;
    the digital processor is further connected to the second channel correction module, and is further configured to perform digital processing on the digital signal after second analogue-to-digital conversion to obtain a third digital signal, and output the third digital signal to the second channel correction module;
    the second channel correction module is further connected to the digital-to-analogue converter, and is configured to receive the third digital signal and a fourth digital signal that is to be corrected, correct the fourth digital signal according to the third digital signal, and output the corrected digital signal to the digital-to-analogue converter;
    the digital-to-analogue converter is connected to the modulator, and is configured to perform digital-to-analogue conversion on the corrected digital signal, and output an analogue signal obtained through the digital-to-analogue conversion to the modulator;
    the modulator is connected to the analogue transmitting front end, and is configured to modulate the analogue signal obtained through the digital-to-analogue conversion, and output the modulated analogue signal to the analogue transmitting front end; and
    the analogue transmitting front end is configured to perform power amplification processing on the modulated analogue signal, transmit the analogue signal after power amplification and output the analogue signal after power amplification to the frequency converter.

3. The device for communication correction according to claim 2, wherein the selection control module adopts a time division multiplexing manner to control the communication between the frequency converter and the analogue radio-frequency front end, or control the communication between the frequency converter and the analogue transmitting front end.

4. The device for communication correction according to claim 2, wherein the selection control module is a switch module or a radio-frequency combining module.

5. The device for communication correction according to claim 1, wherein the demodulator comprises an analogue demodulator and an intermediate-frequency channel; and the modulator comprises an analogue modulator and an intermediate-frequency channel.

6. A method for communication correction, comprising:
amplifying, by an analogue radio-frequency front end of a receiving channel, a received radio-frequency analogue signal, and outputting the amplified analogue signal to both a demodulator of the receiving channel and a frequency converter of a correction channel;
demodulating, by the demodulator of the receiving channel, the amplified analogue signal, and outputting the demodulated analogue signal to a first analogue-to-digital converter of the receiving channel; and performing analogue-to-digital conversion, by the first analogue-to-digital converter of the receiving channel, on the demodulated analogue signal to obtain a first digital signal, and outputting the first digital signal to a first channel correction module of the receiving channel;
receiving, by the frequency converter of the correction channel, the amplified analogue signal output by the analogue radio-frequency front end of the receiving channel, and performing frequency conversion processing on the amplified analogue signal to obtain a first frequency conversion analogue signal, and outputting the first frequency conversion analogue signal to a second analogue-to-digital converter of the correction channel; performing analogue-to-digital conversion, by the second analogue-to-digital converter of the correction channel, on the first frequency conversion analogue signal to obtain a digital signal after, and outputting the digital signal to a digital processor of the correction channel; and performing digital processing, by the digital processor of the correction channel, on the digital signal to obtain a second digital signal, and outputting the second digital signal to the first channel correction module of the receiving channel; and
correcting, by the first channel correction module of the receiving channel, the first signal according to the second digital signal, and outputting the corrected digital signal.

7. The method for communication correction according to claim 6, wherein before the receiving, by the frequency converter of the correction channel, the analogue signal output by the analogue radio-frequency front end of the receiving channel, the method comprises:
controlling, by a selection control module of the correction channel, communication between the frequency converter of the correction channel and the analogue radio-frequency front end of the receiving channel.

8. The method for communication correction according to claim 6, further comprising:
receiving, by the frequency converter of the correction channel, an analogue signal after power amplification, which is output by an analogue transmitting front end of a transmitting channel, performing frequency conversion processing on the analogue signal after power amplification to obtain a second frequency conversion analogue signal, and outputting the second frequency conversion analogue signal to the second analogue-to-digital converter of the correction channel;
performing analogue-to-digital conversion, by the second analogue-to-digital converter of the correction channel, on the second frequency conversion analogue signal to obtain a digital signal after second analogue-to-digital conversion, and outputting the digital signal after second analogue-to-digital conversion to the digital processor of the correction channel; and performing digital processing, by the digital processor of the correction channel, on the digital signal after second analogue-to-digital conversion to obtain a third digital signal, and outputting the third digital signal to a second channel correction module of the transmitting channel;
receiving, by the second channel correction module of the transmitting channel, the third digital signal and a fourth digital signal that is to be corrected, correcting the fourth digital signal according to the third digital signal, and outputting the corrected digital signal to a digital-to-analogue converter of the transmitting channel;
performing digital-to-analogue conversion, by the digital-to-analogue converter of the transmitting channel, on the corrected digital signal, and outputting an analogue signal obtained through the digital-to-analogue conversion to a modulator of the transmitting channel; and modulating, by the modulator of the transmitting channel, the analogue signal obtained through the digital-to-analogue conversion, and outputting the modulated analogue signal to the analogue transmitting front end of the transmitting channel; and
performing power amplification processing, by the analogue transmitting front end of the transmitting channel, on the modulated analogue signal, transmitting the analogue signal after power amplification, and outputting the analogue signal after power amplification to the frequency converter of the correction channel.

9. The method for communication correction according to claim 8, wherein before the receiving, by the frequency converter of the correction channel, the analogue signal after power amplification, which is output by an analogue transmitting front end of the transmitting channel, the method comprises:
controlling, by the selection control module of the correction channel, communication between the frequency converter of the correction channel and the analogue transmitting front end of the transmitting channel.

10. The method for communication correction according to claim 9, wherein the controlling, by the selection control module of the correction channel, the communication between the frequency converter of the correction channel and the analogue transmitting front end of the transmitting channel comprises:
controlling, by the selection control module of the correction channel, the communication between the frequency converter of the correction channel and the analogue transmitting front end of the transmitting channel in a time division multiplexing manner.

* * * * *